No. 839,584. PATENTED DEC. 25, 1906.
S. & K. HAYFORD.
BICYCLE LOCK.
APPLICATION FILED DEC. 2, 1905.
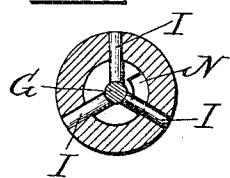
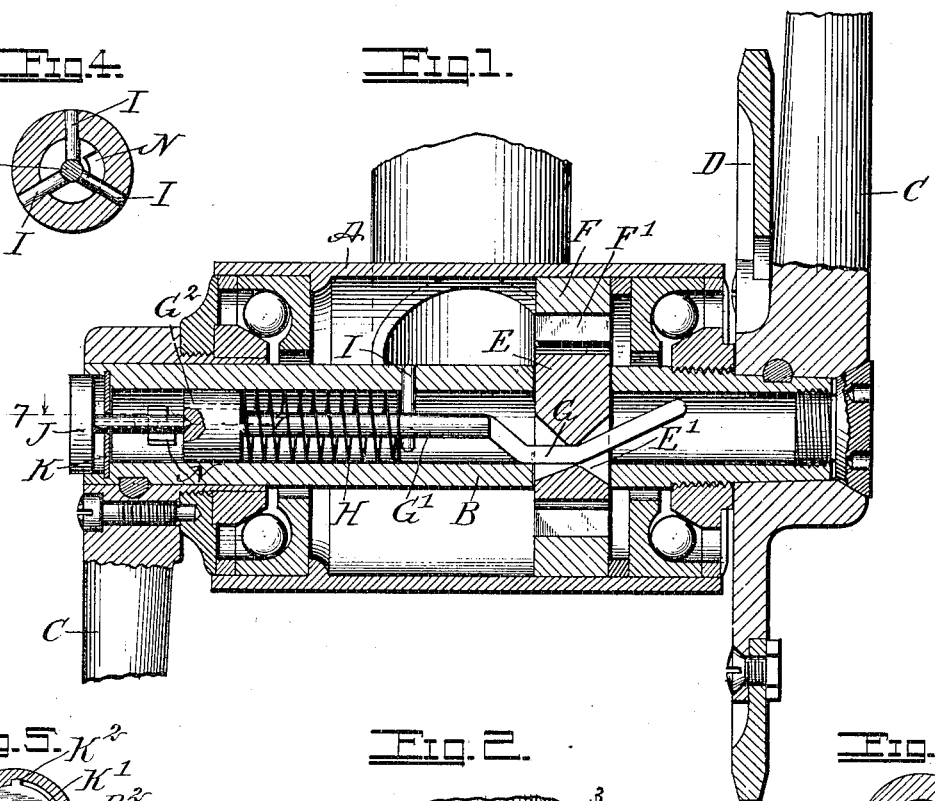
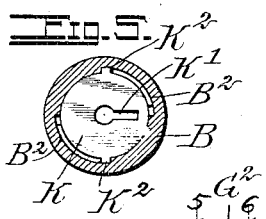
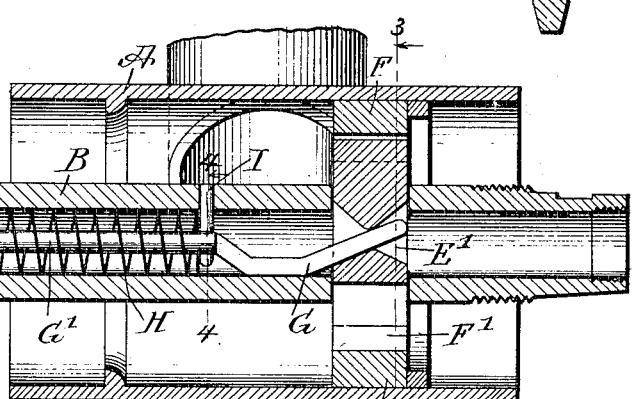
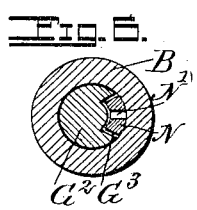
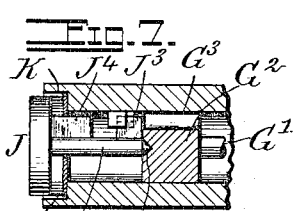
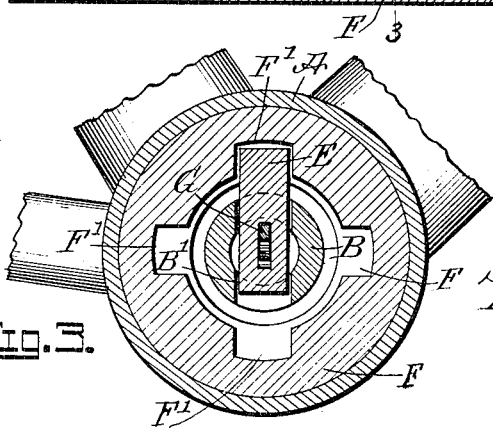
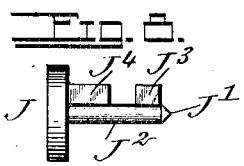
WITNESSES:
INVENTORS
Samuel Hayford
Kirby Hayford
BY
ATTORNEYS

UNITED STATES PATENT OFFICE.

SAMUEL HAYFORD AND KIRBY HAYFORD, OF TURTLE BAYOU, TEXAS.

BICYCLE-LOCK.

No. 839,584.  Specification of Letters Patent.  Patented Dec. 25, 1906.

Application filed December 2, 1905. Serial No. 289,967.

*To all whom it may concern:*

Be it known that we, SAMUEL HAYFORD and KIRBY HAYFORD, citizens of the United States, and residents of Turtle Bayou, in the county of Chambers and State of Texas, have invented a new and Improved Bicycle-Lock, of which the following is a full, clear, and exact description.

The object of the invention is to provide a new and improved bicycle-lock which forms a permanent fixture of the bicycle, is completely out of sight, and arranged to lock the running-gear of the bicycle to prevent unauthorized persons from riding away with the bicycle.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of the improvement as applied to the crank-shaft in the crank-hanger, the several parts being in unlocked position. Fig. 2 is a like view of the same in a locked position and parts of the bicycle being omitted. Fig. 3 is a sectional side elevation of the improvement on the line 3 3 of Fig. 2. Fig. 4 is a like view of the same on the line 4 4 of Fig. 2. Fig. 5 is a similar view of the same on the line 5 5 of Fig. 2. Fig. 6 is a like view of the same on the line 6 6 of Fig. 2. Fig. 7 is a sectional plan view of the same on the line 7 7 of Fig. 1, and Fig. 8 is a plan view of the key.

In the crank-hanger A of the bicycle-frame is journaled in the usual manner a crank-shaft B, having a crank-arm C, one of which carries the wheel D of the bicycle driving-gear. The crank-shaft B is preferably made hollow and provided within the crank-hanger A with a transversely-extending slot B', in which is mounted to slide a bolt E, adapted to engage one of a series of notches F', formed on the inside of a ring-shaped keeper F, secured to the crank-hanger A. The bolt E is provided with a cam-opening E', engaged by a cam-slide G, extending lengthwise in the crank-shaft B and provided with an integral rod G', extending axially in the crank-shaft B. The outer end of the rod G' of the cam-slide G is provided with a head G², fitting snugly in the hollow crank-shaft B, and on the inner end of the said head G² presses one end of a spring H, coiled around the rod G' and resting with its inner end on guide-pins I, secured to the crank-shaft B and forming a guideway for the rod G'. Now when the cam-slide G is moved inwardly into the position shown in Fig. 1 then the cam-slide moves the bolt E into a non-locked position—that is, out of engagement with the notches F' of the keeper F; but when the cam-slide G is moved into an outermost position, as illustrated in Fig. 2, then the bolt E is caused to slide to engage one of the notches F' of the keeper F to lock the crank-shaft B to the crank-hanger A to prevent turning of the crank-shaft with a view to prevent unauthorized persons from riding off with the bicycle.

The outer face of the head G² of the cam-slide G is adapted to be engaged by the pointed end J' on the shank J² of a key J, having spaced bits J³ and J⁴, as plainly shown in Fig. 8. The bits J³ and J⁴ and the shank J² are adapted to pass through the keyhole K' in a disk-shaped escutcheon K, mounted to turn in the outer end of the crank-shaft B, the said escutcheon K having lugs K² fitting into segmental recesses B², formed on the crank-shaft B, to limit the turning motion of the escutcheon K. A ring L serves to hold the escutcheon K in position on the crank-shaft B.

Within the crank-shaft B is secured or formed a lug N, having a lengthwise-extending recess N', beginning at the inner end of the lug and terminating a distance from the outer end thereof, so as to form a seat for the bit J³ of the key J. Now when the key J is in the position shown in Fig. 1 and this bit J³ is seated on the lug N, as described, then the cam-slide G is in an innermost position, and the bolt E is withdrawn from the keeper F, and consequently the crank-shaft B is unlocked and is free to turn in its bearings in the crank-hanger A. When it is desired to lock the crank-shaft B in the crank-hanger A, then the operator presses the key J inwardly a distance to disengage the bit J³ from the recess N' of the lug N, and then the operator gives a half-turn to the key J, so as to free the bit J³ completely from the lug N by moving the bit J³ completely out of the path of the lug N. The operator now releases the pressure on the key J, so that the spring H moves the cam-slide G outward, whereby the bolt E is engaged with one of the notches F' in the keeper F, and the crank-shaft B is consequently locked to the hanger A by the said bolt and keeper.

The head $G^2$ of the cam-slide G is provided with a cut-out portion $G^3$ (see Fig. 6) to allow the head $G^2$ to pass the lug N, as will be readily understood by reference to the drawings. By the outward movement of the cam-slide G the key J is carried along and is thus removed from the device and kept by the operator until it is again desired to unlock the crank-shaft B. This is done by inserting the key J through the keyhole in the escutcheon K and forcing the cam-slide G inward against the tension of the spring H, so that the bolt E is moved out of engagement with the keeper F. When the key J is in an innermost position, the operator gives it a half-turn to bring the bit $J^3$ in alinement with the recess N', and when the operator now releases the key the latter moves slightly outward—that is, until the bit $J^3$ is seated in the recess N' of the lug N.

From the foregoing it will be seen that the locking device is completely out of sight, is composed of comparatively few parts, and cannot well be tampered with unless a person is in possession of the right key.

By having the bit $J^4$ engaging a portion of the keyhole K' it is evident that when the bolt E is in an unlocked position the keyhole is completely filled, so as to prevent dust from passing to the interior of the lock, and when the key is withdrawn, as previously explained, then the outer face of the head $G^2$ abuts against the inner face of the escutcheon K to close the keyhole to exclude dust. (See Fig. 2.)

Having thus described our invention, we claim as new and desire to secure by Letters Patent—

1. The combination with a bicycle, of a lock therefor comprising a bolt slidably mounted in the crank-shaft, a keeper for the bolt secured to the crank-case, a cam-slide within the crank-shaft for manipulating the bolt, said cam-slide adapted to be operated by a key.

2. The combination with the bicycle having a hollow crank-shaft, of a lock therefor comprising a bolt slidably mounted in the crank-shaft, a keeper for the bolt secured to the crank-case, a cam-slide within the hollow crank-shaft for manipulating the bolt, a spring in connection with the cam-slide for normally maintaining the bolt in engagement with the keeper, said cam-slide adapted to be operated by a key whereby the bolt is released.

3. A bicycle-lock, comprising a slidable bolt, a keeper having notches for engagement by the said bolt, a cam-slide engaging the said bolt for moving the latter in and out of engagement with the notches of the said keeper, a spring pressing the said cam-slide to move it lengthwise in one direction, an escutcheon having a limited turning motion, said escutcheon being adapted to be turned by a key, said key being adapted to push the cam-slide in the reverse direction to that given by the spring, and means for holding the said key against withdrawal.

4. A bicycle-lock, comprising a slidable bolt, a keeper having notches for engagement by the said bolt, a cam-slide engaging the said bolt for moving the latter in and out of engagement with the notches of the said keeper, a spring pressing the said cam-slide to move it lengthwise in one direction, an escutcheon having a limited turning motion, a recessed fixed lug, said escutcheon being adapted to be engaged by a key having spaced bits, one for engagement with the keyhole in the escutcheon for turning the latter, and the other bit being adapted to be seated on the said lug.

5. The combination with the bicycle having a hollow crank-shaft, of a lock therefor comprising a bolt slidably mounted in the crank-shaft, a keeper for the bolt secured to the crank-case, a cam-slide within the crank-shaft for manipulating the bolt, a spring in connection with the cam-slide for normally maintaining the bolt in engagement with the keeper, said cam-slide being adapted to be operated by a key for releasing the bolt, and means in connection with the crank-shaft for locking the key whereby to retain the bolt out of engagement with the keeper.

In testimony whereof we have signed our names to this specification in the presence of two subscribing witnesses.

SAMUEL HAYFORD.
KIRBY HAYFORD.

Witnesses:
R. DREYFUS,
E. L. READING.